United States Patent [19]

Gillespie

[11] 4,256,695
[45] Mar. 17, 1981

[54] COPPER LIQUOR CONTROL SYSTEM

[75] Inventor: Ronald G. Gillespie, Old Tappan, N.J.

[73] Assignee: Texaco Development Corporation, White Plains, N.Y.

[21] Appl. No.: 105,456

[22] Filed: Dec. 20, 1979

[51] Int. Cl.³ .................... G01N 27/00; G06F 15/46
[52] U.S. Cl. .................................. 422/62; 23/230 A; 364/500; 422/119
[58] Field of Search ............... 422/62, 119; 23/230 A; 364/497, 500, 105, 106

[56] References Cited

U.S. PATENT DOCUMENTS

| | | | |
|---|---|---|---|
| 3,512,956 | 5/1970 | Holderreed et al. | 422/62 X |
| 3,898,042 | 8/1975 | Webb et al. | 422/62 X |
| 4,053,743 | 10/1977 | Niemi | 364/500 |
| 4,055,751 | 10/1977 | Bussmann et al. | 364/500 |
| 4,094,959 | 6/1978 | Ball et al. | 23/230 A |
| 4,096,301 | 6/1978 | Slominski et al. | 23/230 A |

Primary Examiner—R. E. Serwin
Attorney, Agent, or Firm—Carl G. Ries; Robert A. Kulason; Ronald G. Gillespie

[57] ABSTRACT

A control system controls the cupric ions content and the cuprous ions content of a copper liquor so as to control the strength of the copper liquor. The system includes a sensor sampling the copper liquor which provides a signal corresponding to the strength of the Copper liquor. A network provides reference signals corresponding to an upper limit and a lower limit for the strength of the copper liquor. A comparison circuit compares the copper liquor strength signal with the reference signals and provides a signal corresponding to the comparison. Apparatus controls the addition of air to the copper liquor so as to control the cupric ion content and the cuprous ion content of the copper liquor in accordance with the comparison signal in the comparison circuit.

6 Claims, 1 Drawing Figure

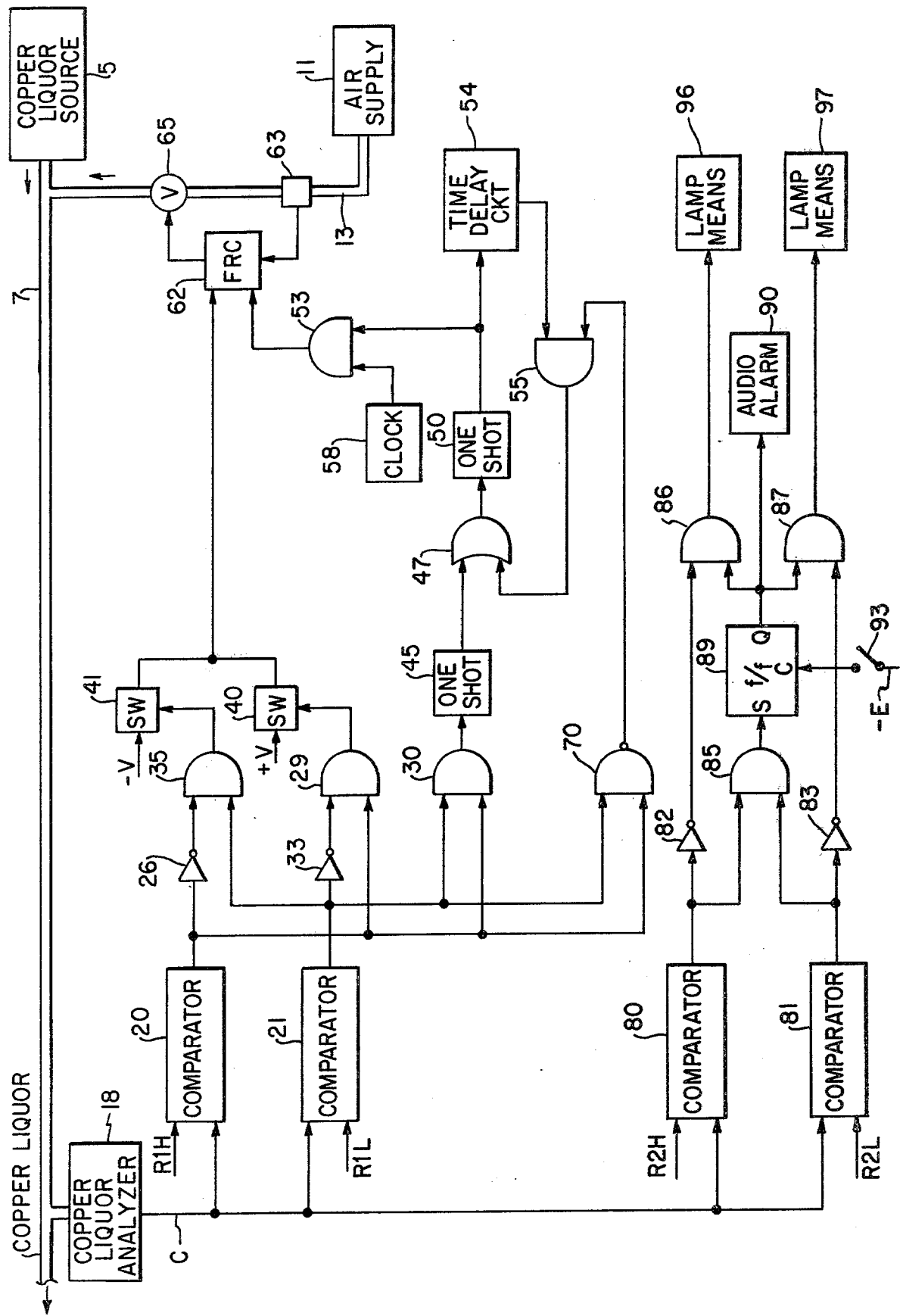

COPPER LIQUOR CONTROL SYSTEM

BACKGROUND OF THE INVENTION

Field of the Invention

The present invention relates to control systems in general and, more particularly, to a control system involved in a refining unit.

SUMMARY OF THE INVENTION

A control system controls the strength of a copper liquor, used in a refining operation of a petroleum stock, which contains cupric ions and cuprous ions. A sensor samples the copper liquor and provides a signal corresponding to the strength of the copper liquor. Reference signals are generated corresponding to an upper limit and a lower limit for the strength of the copper liquor. A comparison circuit compares the signal from the sensor with the reference signals and provides a corresponding comparison signal. Apparatus controls controls the addition of air to the copper liquor to control the cupric ion content and the cuprous ion content in accordance with the comparison signal so as to control the strength of the copper liquor.

The objects and advantages of the invention will appear more fully hereinafter from a consideration of the detailed description which follows, taken together with the accompanying drawing, wherein one embodiment of the invention is illustrated by way of example. It is to be expressly understood, however, that the drawing is for illustrative purposes only and is not to be construed as defining the limits of the invention.

DESCRIPTION OF THE DRAWING

The drawing is a detailed block diagram of a copper liquor control system, constructed in accordance with the present invention, for controlling the strength of a copper liquor.

DESCRIPTION OF THE INVENTION

Referring to the drawing, a source 5 provides copper liquor to a line 7. A source 11 provides air to the copper liquor through a line 13 to line 7.

The strength of the copper liquor is controlled by controlling the ratio of the cupric ions to the cuprous ions in the copper liquor. The air oxidizes the cuprous ions thereby converting them to cupric ions. Thus by controlling the air mixing with the copper liquor, the strength of the copper liquor is controlled. A copper liquor analyzer 18, which may be of the type described and disclosed in U.S. application No. 105,455, filed Dec. 20, 1979 and assigned to Texaco Inc., assignee of the present invention, samples the copper liquor in line 7 and provides a signal C corresponding to its strength. Signal C is applied to comparators 20 and 21 also receiving direct current reference voltages RIH and RIL, respectively, defining a high control limit and a low control limit, respectively, for an acceptable strength for the copper liquor. Comparator 20 provides its output to an inverter 26 and to AND gates 29 and 30; while comparator 21 provides its output to an inverter 33 and to AND gates 30, 35. Inverters 26, 33 provide their outputs to AND gates 35 and 29, respectively. The outputs of AND gates 29, 35 are applied to switches 40 and 41, respectively, which received +V and −V direct current voltages, respectively. The outputs terminals of switches 40 and 41 tied together so that switches 40 and 41 cooperate to provide a directional signal as hereinafter explained.

AND gate 30 is connected to a one-shot multivibrator 45 which in turn is connected to an OR gate 47. The output of time delay circuit 54 is applied to an AND gate 55. The directional signal provided by switches 40, 41 and passed pulses from AND gate 53 are provided to a flow recorder controller 42 receiving a signal from a flow transmitter 63 in line 13 and providing a control signal to a valve 65 in line 13. Valve 65 controls the flow of the cupric iron concentrate from source 11.

In operation while the strength of the copper liquor is within the desirable limits, comparators 20, 21 provide their outputs at high logic levels which are inverted to low logic levels by inverters 26, 33 thereby disabling AND gates 35 and 29, respectively. AND gates 29, 35 in turn provide low logic level outputs. The low logic level outputs from AND gates 29, 35 cause switches 41 and 40, respectively, to block the applied direct current voltages and therefore does provide a directional signal so that the air flow in line 13 cannot be inadvertently changed.

Should signal C exceed voltage RIH in amplitude, comparator 20 output goes to a low logic level causing inverter 16 to provide a high logic level output to AND gate 35. Comparator 21 continues to provide a high logic level output to AND gate 35 so that AND gate 35 in turn provides a high logic level output to switch 41 rendering it conductive to pass the −V voltage as the directional signal to controller 62. A low logic output from comparator 20 disables AND gate 30 causing its output to change to a low logic level thereby triggering one-shot 45. The resulting pulse from one-shot 45 passes through OR gate 47 to trigger one-shot 50. One-shot 50 provides an enabling pulse to AND gate 33. The width of the enabling pulse is a design parameter selected to allow a predetermined number of pulses from clock 58 to pass through AND gate 53. In practice, enough pulses are allowed to pass through AND gate 53 to change the set point of flow recorder controller 62 from a condition exceeding the high limit or low limit to the neutral position half way between the high limit and the low limit. The passed pulses from AND gate 53 change the set point of controller 62 in the direction controlled by the directional signal. Flow recorder controller 62 altered its control signal to valve 65 thereby controlling the air flow in line 13.

The enabling pulse provided by one-shot 50 triggers time delay circuit 54 which at the end of a predetermined time delay provides a pulse to an AND gate 55. If within the time period determined by the time delay, the strength of the copper liquor has returned to a proper value, a NAND gate 70, receiving the outputs from comparators 20 and 21, provides a low logic level signal disabling AND gate 35 to block the pulse from time delay circuit 54. If the copper liquor strength is still out of spec, then one of the outputs from comparators 20, 21 is at a low logic level causing NAND gate 70 to provide a high logic level to enable AND gate 55. When enabled, the pulse from time delay circuit 54 passes through AND gate 55 and OR gate 47 to again change the setting of the set point of flow recorder controller 62 as hereinbefore explained.

Another feature of the present invention is a provision for sounding an audible alarm and providing a visual indication of excessive strength or excessive weakness of the copper liquor so that an operator can manually adjust the cupric ion solution flow. This provision is useful when the strength of the copper liquor is so far out of specification that a large change in the flow rate of the cupric ion concentrate in line 17 is required and to achieve that change through the automatic control system would allow too much time to elapse. Signal C is applied to comparators 80, 81 receiving reference signals R2H and R2L corresponding to a high alarm limit and a low alarm limit respectively for a range of copper liquor strength greater than the range defined by R1H and R1L. The output of comparator 80 is applied to an AND gate 85 and to an inverter 82, while the output of comparator 81 is applied to AND gate 85 and to an inverter 83. The output from AND gate 85 is applied to a set input of a flip-flop 89 having its Q output applied to AND gates 86, 87 and to an audio alarm 90. The outputs of inverters 82, 83 are applied to AND gates 86 and 87, respectively. A momentary manually operative switch 93 receiving a negative direct current voltage −E is connected to a clear input of flip-flop 89 so that an operator may momentarily close switch 93 to provide a pulse to flip-flop 89 thereby triggering it to its clear state. Flip-flop 89 provides its Q output at a high logic level while in the set state and at a low logic level while in a clear state. The outputs of AND gates 86, 87 are provided to lamp means 96 and 97, respectively.

In operation when signal C exceeds one of the two limits, either comparators 80 or 81 provides a low logic output which causes AND gate 85 output to go from a high logic level to a low logic level triggering flip-flop 89 to the set state. The resulting high level Q output from flip-flop 89 enables AND gates 86 and 87 and causes audio alarm 90 to provide an audible sound.

The low logic level output from either comparator 80 or 81 is inverted by inverter 82 or 83 to a high logic level to enable either AND gate 86 or 87. The output from the enabled AND gate 86 or 87 goes to a high logic level thereby causing either lamp means 96 or 97 to provide a visual display. Thus an operator hearing the audio alarm then checks lamp means 96, 97 to determine in which direction the strength of the copper liquor should be changed and changes it accordingly. The operator momentarily closes switch 93 to reset flip-flop 89 and shut-off the audio alarm.

As hereinbefore described, the present invention is a control system which controls the strength of copper liquor in a refining unit.

What is claimed is:

1. A control system for controlling the strength of a copper liquor which contains cupric ions and cuprous ions, comprising means for sensing the strength of the copper liquor and providing a corresponding strength signal, reference signal means for providing a first set of reference signals corresponding to an upper control limit and to a lower control limit for the strength of the copper liquor, first comparing means connected to the sensing means and to the reference signal means for comparing the strength signal with the first set of reference signals and providing a first comparison signal in accordance with the comparison, and means connected to the comparing means for controlling the addition of air to the copper liquor to control the cupric ion content and the cuprous ion content of the copper liquor so as to control the strength of the copper liquor in accordance with the first comparison signal.

2. A control system as described in claim 1 in which the reference signal means provides a second set of reference signals corresponding to an upper alarm limit and to a lower alarm limit of copper strength beyond which the control system cannot sufficiently control the strength of the copper liquor, and further comprising second comparing means connected to the sensing means and to the reference signal means for comparing the strength signal with the second set of reference signals and providing a second comparison signal corresponding to the comparison, alarm means connected to the second comparing means for providing an audible and visual alarm that the copper liquor strength has exceeded one of the limits defined by the second set of reference signals and indicating whether the copper liquor strength should be increased or decreased to correct the extreme condition.

3. Control system as described in claim 1 or 2 in which the control means includes means connected to the first comparing means for providing a direct current directional signal in accordance with the first comparison signal when the copper liquor strength exceeds one of the control limits, the polarity of the directional signal corresponds to which control limit has been exceeded, pulse means connected to the first comparing means for periodically providing pulses when the copper liquor strength exceeds one of the control limits, and apparatus means connected to the directional signal means and to the pulse means for controlling the amount of cupric ions or cuprous ions entering the copper liquor in a manner so that each pulse of the pulse means causes a predetermined change in the control of the cupric ions and cuprous ions and in a direction in accordance with the directional signal.

4. A control system as described in claim 3 in which the first comparing means includes first and second comparators receiving an upper control limit reference signal and a lower control limit reference signal, respectively, and the strength signal, said first and second comparators comparing the strength signal with the reference signals and providing outputs corresponding to the comparison, first and second inverters connected to the first and second comparators, respectively, invert the outputs from the first and second comparators from one logic level to the other logic level, a first AND gate connected to the first inverter and to the second comparator provides a first switch signal at a high logic level in accordance with the outputs from the first inverter and the second comparator and provides a low logic level switch signal when one of the outputs of the first inverter and the second comparator is at a low logic level so that first AND gate provides the first switch signal at the high logic level when the strength signal exceeds the upper control limit, and at low logic level when the strength signal does not exceed the upper control limit, a second AND gate connected to the second inverter and to the first comparator provides a second switch signal at a high logic level when the outputs from the second inverter and the first comparator are at high logic levels and at a low logic level when at least one of the outputs from the second inverter and the first comparator is at a low logic level so that the second AND gate provides the second switch signal at a high logic level when the strength signal exceeds the lower control limit, and at a low logic level when the strength signal does not exceed the lower control limit, first switching means connected to the apparatus means and to the first and second AND gates and receiving a negative direct current voltage and a positive direct current voltage and responsive to the first and second switch signals for passing the negative direct current voltage when the first switch signal is at a high logic level to provide a negative polarity directional signal to the apparatus means and for passing the positive direct current voltage when the second switch signal is at a high logic level to provide the directional signal at a positive polarity and for blocking the positive and negative direct current voltages when the switch signals from the first and second AND gates are at low logic levels so as to provide no directional signal.

5. A control system as described in claim 4 in which the pulse means includes a third AND gate connected to the first and second comparators which provide a high logic level output when the outputs from the first and second comparators are at a high logic level and a low logic level output when at least one of the outputs from the first and second comparators is at a low logic level, a first one-shot multivibrator connected to the third AND gate and responsive to the output from the third AND gate changing from a high logic level to a low logic level to provide a pulse, a NOR gate connected to the first one-shot multivibrator passes pulses provided by first one-shot multivibrator, a second one-shot multivibrator connected to the OR gate and responsive to a passed pulse for providing another pulse, clock means for providing clock pulses, a fourth AND gate connected to the apparatus means, to the clock means and to the second one-shot multivibrator which is controlled by pulses from the second multivibrator to pass clock pulses so as to provide the pulses to the apparatus means, a time delay circuit means connected to the second one-shot multivibrator for effectively delaying pulses from the second one-shot multivibrator, a NAND gate connected to the first and second comparators which provides a high logic level output when one of the outputs from the first and second comparators is at a low logic level and for providing a low logic level output when both outputs from the first and second comparators are at high logic levels, a fifth AND gate connected to the time delay circuit means and to the NAND gate which is controlled by a high logic level output from the NAND gate to pass delayed pulse from the time delay circuit to the OR gate so as to repeat the operation of providing pulses and controlled by a low logic level output from the NAND gate to block the delayed pulses.

6. A control system as described in claim 2 in which the second comparing means includes third and fourth comparators connected to the sensing means and receiving the upper alarm limit reference signal and the lower alarm limit reference signal, respectively, said third comparator providing a high logic level output when the strength signal is greater than the upper alarm limit reference signal and a low logic level output when the strength signal is equal to or less than the upper alarm limit reference signal and said fourth comparator providing a high logic level output when the strength signal is greater than the lower alarm limit reference signal and a low level output when the strength signal is equal to or less than the lower alarm limit reference signal, a sixth AND gate connected to the third and fourth comparators which provides a high logic level output when the outputs from the third and fourth comparators are at a high logic level and a low level output when at least one of the outputs from the third and fourth comparators is at a low logic level, a flip-flop having a set input connected to the sixth AND gate and responsive to the output from the sixth AND gate going from a high logic level to a low logic level to change to the set state and provides an output at a high logic level while in the set state and at low logic level while in the clear state, manual operative switching means receiving a negative direct current voltage for being responsive to manual operation to temporarily pass the negative voltage as a negative pulse to the clear input of the flip-flop so as to trigger the flip-flop to the clear state, third and fourth inverters connected to the third and fourth comparators invert the outputs from the comparators from one logic level to the other logic level, a seventh AND gate connected to the third inverter and to the flip-flop provides an output at a high logic level when the outputs from the third inverter and the flip-flop are at high logic levels, and at a low logic level output when at least one of the outputs from the third inverter and the flip-flop is at a low logic level, and eighth AND gate connected to the fourth inverter and to the flip-flop provides an output at a high logic level output when the outputs from the fourth inverter and the flip-flop are at high logic levels and at a low logic level output when at least one of the outputs from the fourth inverter and the flip-flop is at a low logic level, audio means connected to the flip-flop for providing an audible alarm when the output from the flip-flop is at a high logic level and not to provide an audible alarm when the output from the flip-flop is at a low logic level, and lamp means connected to the seventh and eighth AND gates for providing a visual indication of which alarm limit is being exceeded when an alarm limit is being exceeded in accordance with the outputs from the AND gates and to provide no visual indication when an alarm limit is not being exceeded.

* * * * *